(12) United States Patent
Gabriel

(10) Patent No.: US 8,881,284 B1
(45) Date of Patent: Nov. 4, 2014

(54) METHOD AND SYSTEM FOR SECURE NETWORK ACCESS USING A VIRTUAL MACHINE

(75) Inventor: Basil S. Gabriel, Downey, CA (US)

(73) Assignee: Symantec Operating Corporation, Mountain View, CA (US)

( * ) Notice: Subject to any disclaimer, the term of this patent is extended or adjusted under 35 U.S.C. 154(b) by 860 days.

(21) Appl. No.: 12/140,037

(22) Filed: Jun. 16, 2008

(51) Int. Cl.
*G06F 11/00* (2006.01)

(52) U.S. Cl.
USPC ................. 726/24; 726/22; 726/23; 713/168; 713/188; 709/23; 709/203; 709/224

(58) Field of Classification Search
USPC ........... 726/24, 22, 23; 713/168, 188; 709/22, 709/203, 224
See application file for complete search history.

(56) References Cited

U.S. PATENT DOCUMENTS

| | | | |
|---|---|---|---|
| 7,260,725 B2 | 8/2007 | Carmona et al. | 713/187 |
| 7,266,845 B2 | 9/2007 | Hypponen | 726/24 |
| 7,363,506 B2 | 4/2008 | Carbone | 713/188 |
| 7,367,057 B2 | 4/2008 | Das et al. | 726/24 |
| 8,056,076 B1 * | 11/2011 | Hutchins et al. | 718/1 |
| 2002/0161828 A1 * | 10/2002 | Edison et al. | 709/203 |
| 2002/0162015 A1 * | 10/2002 | Tang | 713/200 |
| 2004/0015712 A1 * | 1/2004 | Szor | 713/200 |
| 2004/0034794 A1 * | 2/2004 | Mayer et al. | 713/200 |
| 2005/0187740 A1 * | 8/2005 | Marinescu | 703/1 |
| 2005/0273856 A1 * | 12/2005 | Huddleston | 726/22 |
| 2005/0283838 A1 * | 12/2005 | Saito | 726/24 |
| 2006/0021029 A1 * | 1/2006 | Brickell et al. | 726/22 |
| 2007/0094348 A1 * | 4/2007 | Scheidel et al. | 709/217 |
| 2007/0136579 A1 * | 6/2007 | Levy et al. | 713/168 |
| 2007/0174915 A1 * | 7/2007 | Gribble et al. | 726/24 |
| 2007/0234356 A1 * | 10/2007 | Martins et al. | 718/1 |
| 2008/0133208 A1 * | 6/2008 | Stringham | 703/20 |
| 2008/0134176 A1 * | 6/2008 | Fitzgerald et al. | 718/1 |
| 2008/0301051 A1 * | 12/2008 | Stahlberg | 705/44 |
| 2009/0031421 A1 * | 1/2009 | Lee et al. | 726/23 |
| 2009/0089879 A1 * | 4/2009 | Wang et al. | 726/24 |
| 2009/0125902 A1 * | 5/2009 | Ghosh et al. | 718/1 |
| 2009/0300599 A1 * | 12/2009 | Piotrowski | 717/174 |

* cited by examiner

*Primary Examiner* — Kambiz Zand
*Assistant Examiner* — Sayed Beheshti Shirazi
(74) *Attorney, Agent, or Firm* — Campbell Stephenson LLP

(57) ABSTRACT

A method and apparatus for secure network access using a virtual machine are disclosed. The method includes provisioning a virtual machine, downloading content to the virtual machine, and sending information from the virtual machine. The information that is sent from the virtual machine is configured to allow the display of output from the virtual machine. The output from the virtual machine is based on the content. The apparatus includes a number of virtual machine servers. Each of the virtual machine servers is configured to support at least one of a number of virtual machines. A first virtual machine of the virtual machines includes an antivirus module. The first virtual machine is configured to download content. The antivirus module is configured to detect a virus by virtue of being configured to analyze the content.

30 Claims, 11 Drawing Sheets

METHOD AND SYSTEM FOR SECURE NETWORK ACCESS USING A VIRTUAL MACHINE

FIELD OF THE INVENTION

The present invention relates to the field of secure network access, and particularly to a method and system for secure network access using a virtual machine.

BACKGROUND OF THE INVENTION

Computer viruses (or, more simply, viruses) are a major problem in modern day computing. Viruses can be, for example, designed to replicate themselves by attaching themselves to non-virus software. More generally, a virus may be a program (or some unit of code; for example, instructions to which the computer responds, such as a code block, code element, code segment or the like) that may attach to other programs and/or objects, may replicate itself, and/or may perform malicious (or simply unsolicited) actions on a computer system (at a minimum, illicitly consuming system resources). For example, a virus might attach a copy of itself to a spreadsheet program, word processing document, Internet browser, computer game or the like. After a program has been "infected" with a virus, each time the infected program is executed, the virus is also executed, further replicating the virus. Because the presence of computer viruses often goes undetected, viruses can cause unexpected and harmful results. For example, viruses can delete files, alter system settings, and consume system resources. In fact, although described herein as relating to viruses, the present disclosure may be applied to any type of code capable of altering or consuming one or more of a computer's resources or activities, or any portion thereof.

Virus detection software has been developed to detect and eliminate various types of viruses. Virus detection programs typically scan computer files for specific bit patterns associated with known viruses. These bit patterns are often referred to as virus signatures. Scanning files for virus signatures can be a slow and resource draining process. Various techniques have been developed to limit the scope of signature searches. One such technique is "scalpel scanning", which limits signature searching to the parts of file that are likely to contain virus entry points. However, there is a trade-off between the coverage provided and the resources consumed.

Unfortunately, virus writers have thwarted many signature-scanning techniques by creating randomly encrypted and polymorphic viruses. Randomly encrypted viruses are difficult to detect because each new copy of the virus is randomly encrypted, so new virus copies may not exhibit traceable signatures until they are decrypted. Randomly encrypted viruses remain encrypted until just before execution, when they perform self-decryption, which may reveal known signatures. Polymorphic viruses are also difficult to detect because they change their encryption logic with each new infection. That is, the virus produces different encrypting and decrypting code for each new virus that is inserted into non-virus software. Because the encryption/decryption code is constantly changing, copies of the virus may not include traceable signatures, even when the virus is not encrypted.

In response to the more intractable viruses, some virus detection systems emulate executable programs in secure portions of memory. Because encrypted viruses decrypt themselves before executing, emulating potentially infected programs can produce viruses in a decrypted state. Matching decrypted viruses with known virus signatures is typically more effective than doing the same with encrypted viruses. During emulation, the emulator periodically scans the secure memory portion for known virus signatures. If the emulator finds known virus signatures, the corresponding non-virus programs are processed and viruses are removed.

One disadvantage of using emulators to search for virus signatures is that emulators can miss known viruses when the viruses execute before being processed by the emulator, thus infecting the device prior to detection. Another disadvantage is that some viruses are "aware" of emulators and thus will not decrypt themselves when being emulated.

As can therefore be seen, while scanning and emulation can provide some protection, these techniques, in and of themselves, do not provide complete protection. It is therefore desirable to provide a higher level of protection from viruses than is presently available. Moreover, it is desirable to provide such protection in a manner that is easy to use, administer and maintain.

SUMMARY OF THE INVENTION

The present invention meets the above needs by providing a method and system for secure network access using a virtual machine. In one embodiment, a method for secure network access using a virtual machine is disclosed. The method includes provisioning a virtual machine, downloading content to the virtual machine, and sending information from the virtual machine. The information that is sent from the virtual machine is configured to allow the display of output from the virtual machine. The output from the virtual machine is based on the content.

In another embodiment, an apparatus for secure network access using a virtual machine is disclosed. The apparatus includes a number of virtual machine servers. Each of the virtual machine servers is configured to support at least one of a number of virtual machines. A first virtual machine of the virtual machines includes an antivirus module. The first virtual machine is configured to download content. The antivirus module is configured to detect a virus by virtue of being configured to analyze the content.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

The use of the same reference symbols in different drawings indicates similar or identical items.

DETAILED DESCRIPTION

Introduction

Figure 1:
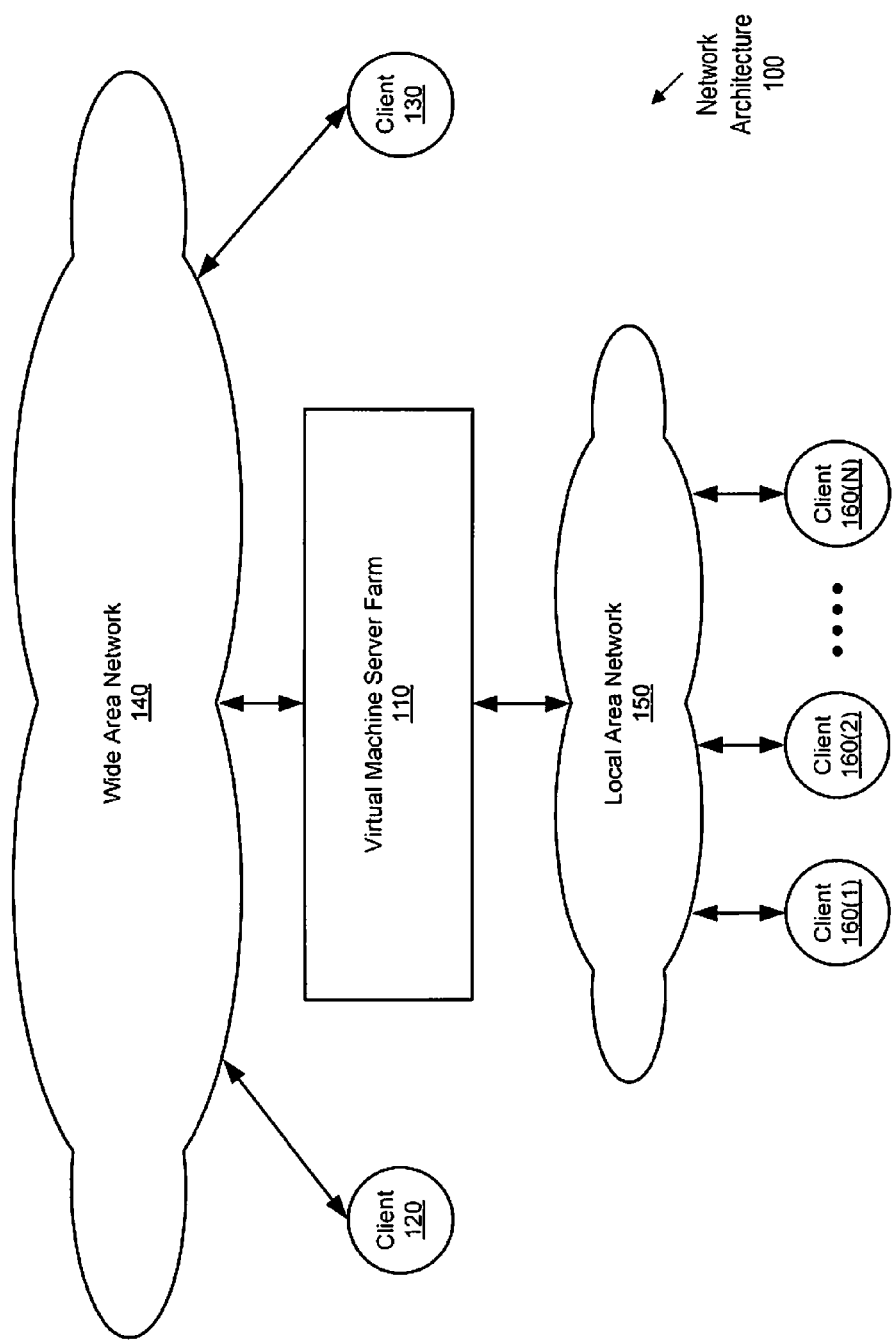
FIG. 1 is a simplified block diagram illustrating an example of a network architecture in which one or more clients have secure network access to a virtual machine server farm.

Embodiments of the present invention provide for the protection of a client (e.g., a computer or other device) from viruses (including "spyware", web sites attempting to obtain personal information ("phishing"), "key loggers", "root kits" and other "malware") and the like. This is achieved by allowing the client to access content (e.g., opening a web site, processing a script (or HTML file), executing an executable file/program, and the like) that may be potentially malicious, harmful or otherwise unwanted, via a virtual machine. The virtual machine in such a system provides the client with a graphical output that presents the software executing on the virtual machine (or content accessed thereby) as a window on the client. In so doing, the use of virtual machines decouples the virtual machines that access the web sites, executable files (or more simply, files), and so on, from the client, which would otherwise have to access the web sites, files and so on (and so expose itself to risk of attack). This is particularly important for "zero day threats"—the first day a virus is sent out. This is because the only effect from the client's perspective is that the virtual machine in use may be affected—the client is never at risk. There is also no need to update protection on the client. Moreover, since the Internet is accessed via a virtual machine, the client enjoys anonymity—any attempt to identify the client/user simply results in information regarding the virtual machine, at best. This ability to anonymize the client is provided by channeling all network access through a virtual machine As will be appreciated, in fact, forcing the client to access the network via a virtual machine guarantees that the client is protected from malicious content. This will be true regardless of the user's desire to access the network in some other, potentially hazardous manner. This approach is particularly attractive in a corporate environment (or the like). This ability to disable direct network access (e.g., via the client's browser), and so forcing the client to access the network through the virtual machine, provides the ability to implement access control by limiting the user's access to the network. Network access can be restricted in any number of ways, including in terms of time, acceptable content and the like. In addition, in the corporate environment, employees' network access can be controlled. The ability to control access also allows the reporting of past network access The virtual machine is provisioned on a virtual machine server that is remote from the client. One or more virtual machines are therefore made available to the client via one or more networks. This allows the client to access the virtual machines from anywhere there is network access, and to thus remotely render (display) the content on the client (in the window on the client provided for such rendering). Moreover, given that the virtual machines are virtual (and so can be provisioned and deprovisioned), the virtual machines are far less susceptible to viruses. When a virtual machine is provisioned, the virtual machine is imaged from a known-good image. This allows the virtual machine to begin with a "clean slate"—there need not be concern that any virus remains from previous use. Subsequent to provisioning, if a web site, script or file causes a virtual machine to become infected, the virtual machine can simply be deprovisioned.

This is of particular value if a user wishes to test a web site, file, script or the like by actually accessing that content. In that case, the virtual machine, provisioned for the given client, can open the web site or execute the file, or task another virtual machine with accessing the content. If the virtual machine performing the access/execution indicates that the given web site/file is malicious in some way (or that virtual machine crashes), the client is spared the effects of the web site/file. The client, at most, witnesses the virtual machine crash, and can simply close the window of the compromised virtual machine. The affected virtual machine can then be cleaned using its antivirus software, or simply deprovisioned (and re-provisioned, if need be).

The virtual machines used to provide functionality such as that described herein can be executed on one or more virtual machine servers. Given that these virtual machines are virtual, each virtual machine must be provisioned on a physical server (referred to herein as a virtual machine server). An aggregation of virtual machine servers is referred to herein as a virtual machine server farm. It will be appreciated that the virtual machine(s) described herein can be supported using a single virtual machine server. However, an aggregation of virtual machine servers does provide several advantages.

The virtual machine servers (and their respective virtual machines) of a virtual machine server farm can be administered centrally, simplifying the administration of the virtual machine servers (and their respective virtual machines). The virtual machine servers for a given entity can have uniform policies implemented, without the need for changing such information on multiple machines (either the clients or the virtual machine servers). Moreover, by having the antivirus modules on the virtual machine servers' virtual machines, updating the antivirus software is centralized and simplified. For example, the server can manage its respective virtual machines' antivirus modules, thus simplifying the management of the virtual machines' antivirus modules. As will be appreciated in light of the present disclosure, this approach is particularly advantageous when compared to having to administer antivirus software on the clients of such a system.

In this vein, an added advantage is that the clients can be assured of always having the latest antivirus software, while avoiding the overhead of having to perform such updates. Given this advantage, an application service provider model using such an architecture can be envisaged, in which users pay a fee (one-time or periodically) to access web sites, files and the like, via one or more virtual machines. Such a subscription service provides a flexible, efficient approach to securely access a network such as the Internet. As will further be appreciated in light of the present disclosure, the approaches discussed in the present disclosure can be extended to comprehend access to a full virtual computing environment. Such a comprehensive virtual computing environment can include one or more applications, including the requisite settings and data files therefor.

Examples of architectures and processes are now provided. These examples describe in greater detail the elements and operations capable of providing secure network access using one or more virtual machines.

An Example Architecture for Secure Network Access

FIG. 1 is a simplified block diagram illustrating a network architecture 100 in which one or more clients are provided with access to a virtual machine server farm 110 via various network connections. As depicted in FIG. 1, clients 120 and 130 access virtual machine server farm 110 via a wide area network 140. A client can be, for example, a desktop computer, a laptop computer, a workstation, a server, a cell phone, a smart phone, a network-enabled personal digital assistant, PDA or the like. An example of wide area network 140, that can be used by clients 120 and 130 to access virtual machine server farm 110, is the Internet. Alternatively, access to virtual machine server farm 110 can be provided by a local area network (depicted in FIG. 1 as a local area network 150). As will be appreciated, virtual machine server farm 110 can also be accessed by clients coupled directly thereto (not shown).

As depicted in FIG. 1, clients 160(1)-(N) access virtual machine server farm 110 via local area network 150. Virtual machine server farm 110 includes a number of virtual machine servers (not shown). These virtual machine servers can be implemented using a variety of hardware platforms, as discussed subsequently herein. Each virtual machine server, in turn, supports one or more virtual machines (not shown). Each virtual machine supports the execution of programs in the manner of a physical machine. However, a virtual machine can be provisioned and deprovisioned as necessary. The details of an example of a virtual machine server farm such as virtual machine server farm 110 are now described in connection with FIG. 2.

In operation, one of the clients depicted in FIG. 1 access virtual machine server farm 110 to request provisioning of a virtual machine. The requested virtual machine is provisioned, and a window is presented on the client (either in a browser window or a window of an application-specific software module). This windowed interface serves not only as a display for content accessed by the virtual machine, but also as a means by which the virtual machine can be controlled (e.g., allowing the user to send commands to control the execution or operation of a program running on the virtual machine), enabling the user to employ the interface to control not only the virtual machine, but also its accessing of content (e.g., opening a web site, executing/operating a program, processing a script or the like). The user can access web sites, files and the like (as well as execute programs (either web-based or application software)), using the virtual machine, and so enjoy the aforementioned benefits, as a result. As will be appreciated, in light of the present disclosure, the only information that need be transferred to the client is the information that is to be displayed on the client. No content need ever be transferred to the client, thereby protecting the client from untoward effects, as noted elsewhere herein.

Furthermore, an application service provider model using such an architecture can be implemented, in which users pay a fee (one-time or periodically) to access web sites, files and the like, via one or more of the virtual machines of virtual machine server farm 110. In such a case, a user would access one or more of the virtual machine servers of virtual machine server farm 110, and request the provisioning of one or more virtual machines. If the user pays periodically, the user can be given access for the period. The user can purchase a constrained amount of computing resources, or have as much in the way of computing resources available as may be necessary. Alternatively, a "pay-as-you-go" plan can be implemented, in which a user pays only for those resources used. Many other approaches will be evident in light of the present disclosure.

Figure 2:
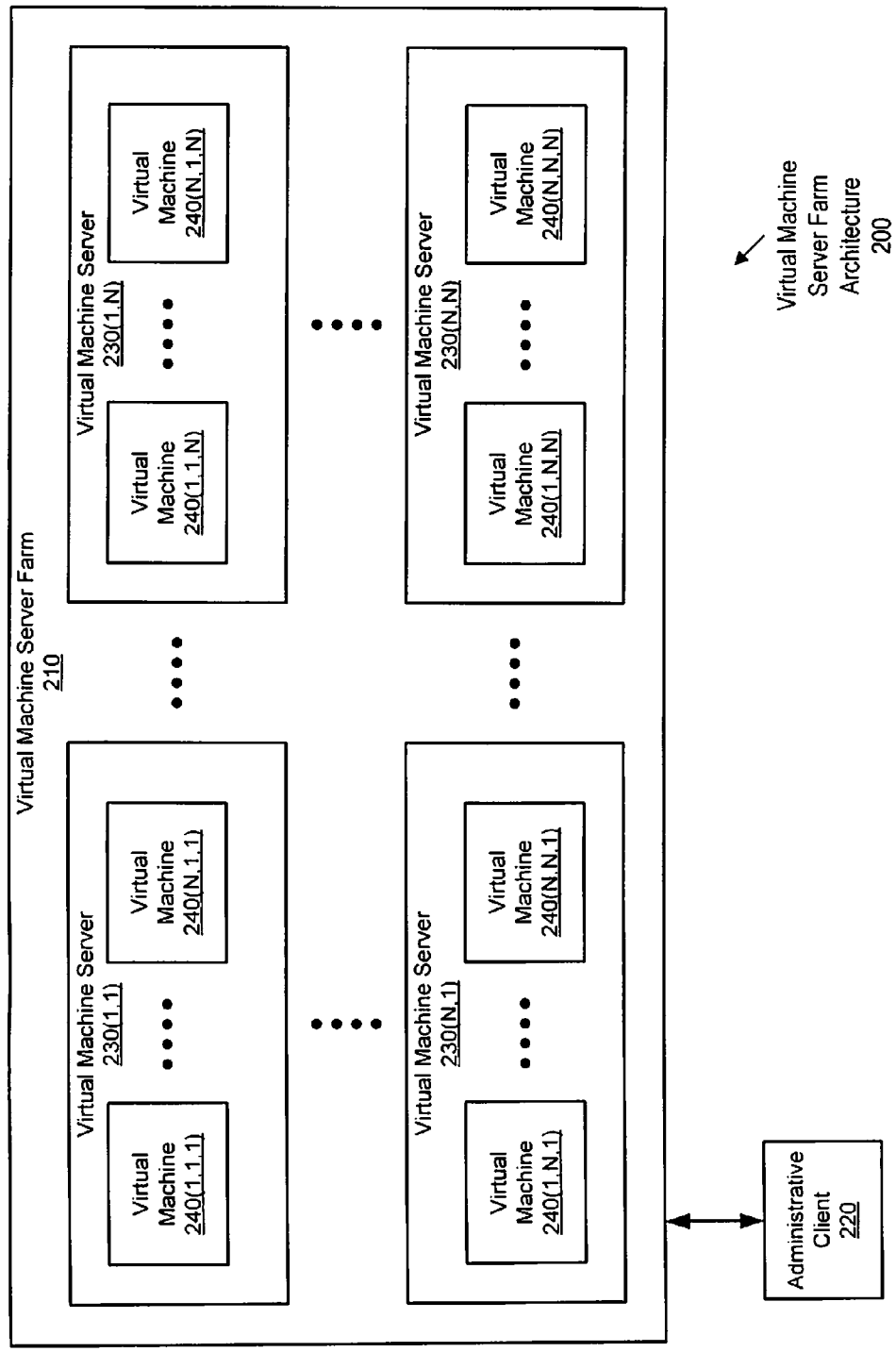
FIG. 2 is a simplified block diagram of an example of a virtual machine server farm.

FIG. 2 is a simplified block diagram of a virtual machine server farm architecture 200. Virtual machine server farm architecture 200 includes a virtual machine server farm 210, which provides an example of virtual machine server farm 110 in greater detail. Virtual machine server farm architecture 200 also includes an administrative client 220, which can be used by an administrator to monitor and control the virtual machines, virtual machine servers and administer the overall operation of virtual machine server farm 210. In the manner noted with regard to virtual machine server farm 110, virtual machine server farm 210 includes a number of virtual machine servers (depicted in FIG. 2 as virtual machine servers 230(1,1)-(N, N)). Each of virtual machine servers 230(1, 1)-(N,N) includes one or more virtual machines (depicted in FIG. 2 as virtual machines 240(1,1,1)-(N,N,N)). As noted earlier, a virtual machine can be provisioned and deprovisioned as needed. Such dynamic control allows a virtual machine that has been infected with a virus to simply be deprovisioned, depriving the virus a platform from which to operate. Given that each virtual machine is provisioned from a known-good image, a virus loses the ability to infect other computing devices by way of installing itself on a given machine (virtual machine). Because the virus never has the opportunity to maintain itself on a machine, as was intended by the creator of the virus, a basic assumption in the creation of the virus is constrained.

An Example Computing and Network Environment

Elements of network architecture 100 can be implemented using a variety of computer systems and networks. An example of one such computing and network environment is described below with reference to FIGS. 3 and 4.

Figure 3:
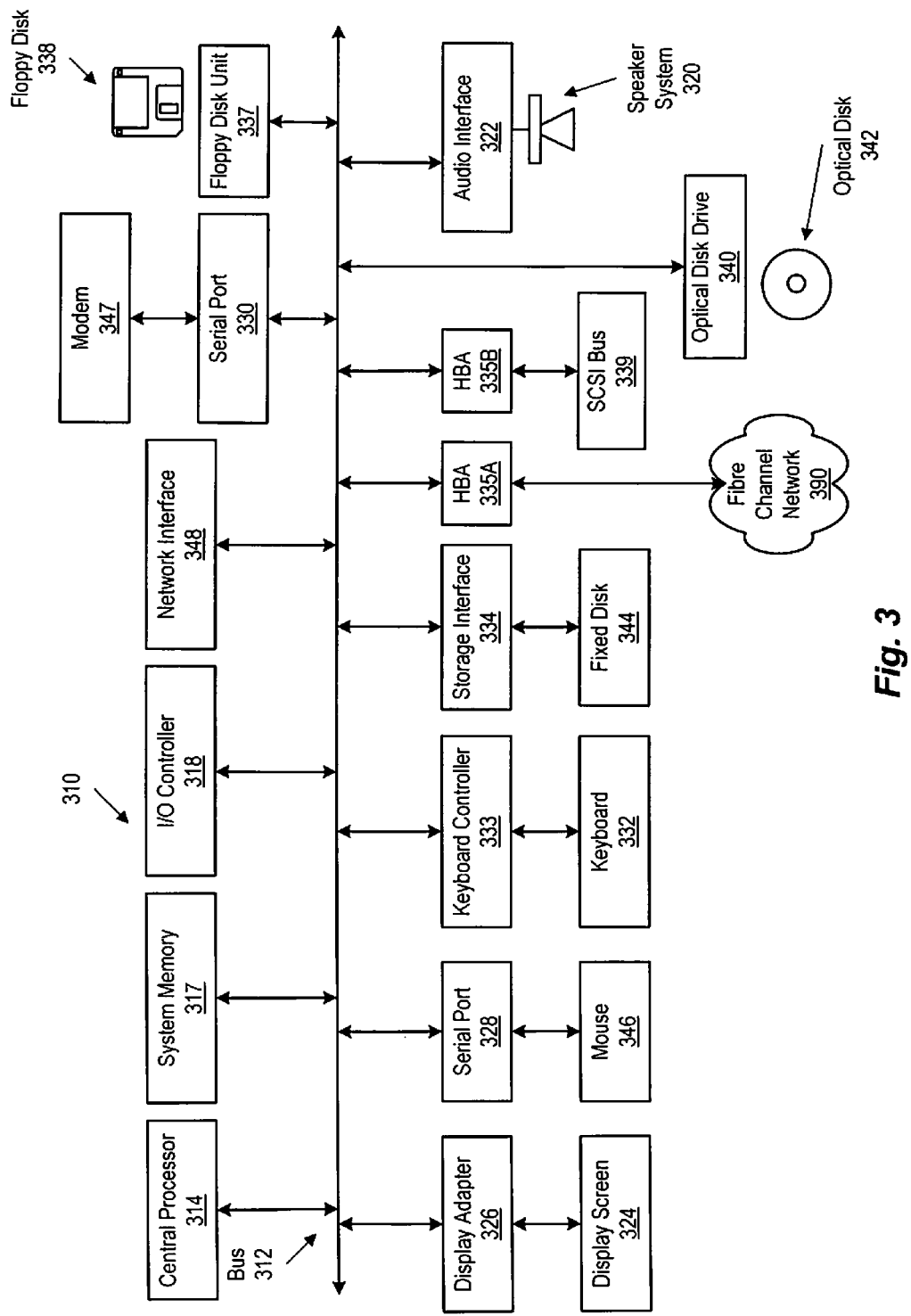
FIG. 3 is a simplified block diagram that depicts an example of a computer system suitable for implementing embodiments of the present invention.

FIG. 3 depicts a block diagram of a computer system 310 suitable for implementing a virtual machine server, as well as the clients used therein. Computer system 310 includes a bus 312 which interconnects major subsystems of computer system 310, such as a central processor 314, a system memory 317 (typically random-access memory (RAM), but which may also include read-only memory (ROM), flash ROM, or the like), an input/output controller 318, an external audio device, such as a speaker system 320 via an audio output interface 322, an external device, such as a display screen 324 via display adapter 326, serial ports 328 and 330, a keyboard 332 (interfaced with a keyboard controller 333), a storage interface 334, a floppy disk drive 337 operative to receive a floppy disk 338, a host bus adapter (HBA) interface card 335A operative to connect with a Fibre Channel network 390, a host bus adapter (HBA) interface card 335B operative to connect to a SCSI bus 339, and an optical disk drive 340 operative to receive an optical disk 342. Also included are a mouse 346 (or other point-and-click device, coupled to bus 312 via serial port 328), a modem 347 (coupled to bus 312 via serial port 330), and a network interface 348 (coupled directly to bus 312).

Bus 312 allows data communication between central processor 314 and system memory 317, which may include read-only memory (ROM) or flash memory (neither shown), and random access memory (RAM) (not shown), as previously noted. RAM is generally the main memory into which the operating system and application programs are loaded. ROM or flash memory can contain, among other code, the Basic Input-Output system (BIOS) which controls basic hardware operation such as the interaction with peripheral components. Applications resident with computer system 310 are generally stored on and accessed via a computer-readable medium, such as a hard disk drive (e.g., fixed disk 344), an optical drive (e.g., optical drive 340), a floppy disk unit 337, or other storage medium. Additionally, applications can be in the form of electronic signals modulated in accordance with the application and data communication technology when accessed via network modem 347 or interface 348.

Storage interface 334, as with the other storage interfaces of computer system 310, can connect to a standard computer-readable medium for storage and/or retrieval of information, such as a fixed disk drive 344. Fixed disk drive 344 may be a part of computer system 310 or may be separate and accessed through other interface systems. Modem 347 may provide a direct connection to a remote server via a telephone link or to the Internet via an internet service provider (ISP). Network interface 348 may provide a direct connection to a remote server via a direct network link to the Internet via a point-of-presence (POP). Network interface 348 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 3 need not be present. The devices and subsystems can be interconnected in different ways from that shown in FIG. 3. The operation of a computer system such as that shown in FIG. 3 is readily known in the art and is not discussed in detail in this application. Code to implement the previously-described features can be stored in computer-readable storage media such as one or more of system memory 317, fixed disk 344, optical disk 342, or floppy disk 338. The operating system provided on computer system 310 may be MS-DOS®, MS-WINDOWS®, OS/2®, UNIX®, Linux®, or another known operating system.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 4:
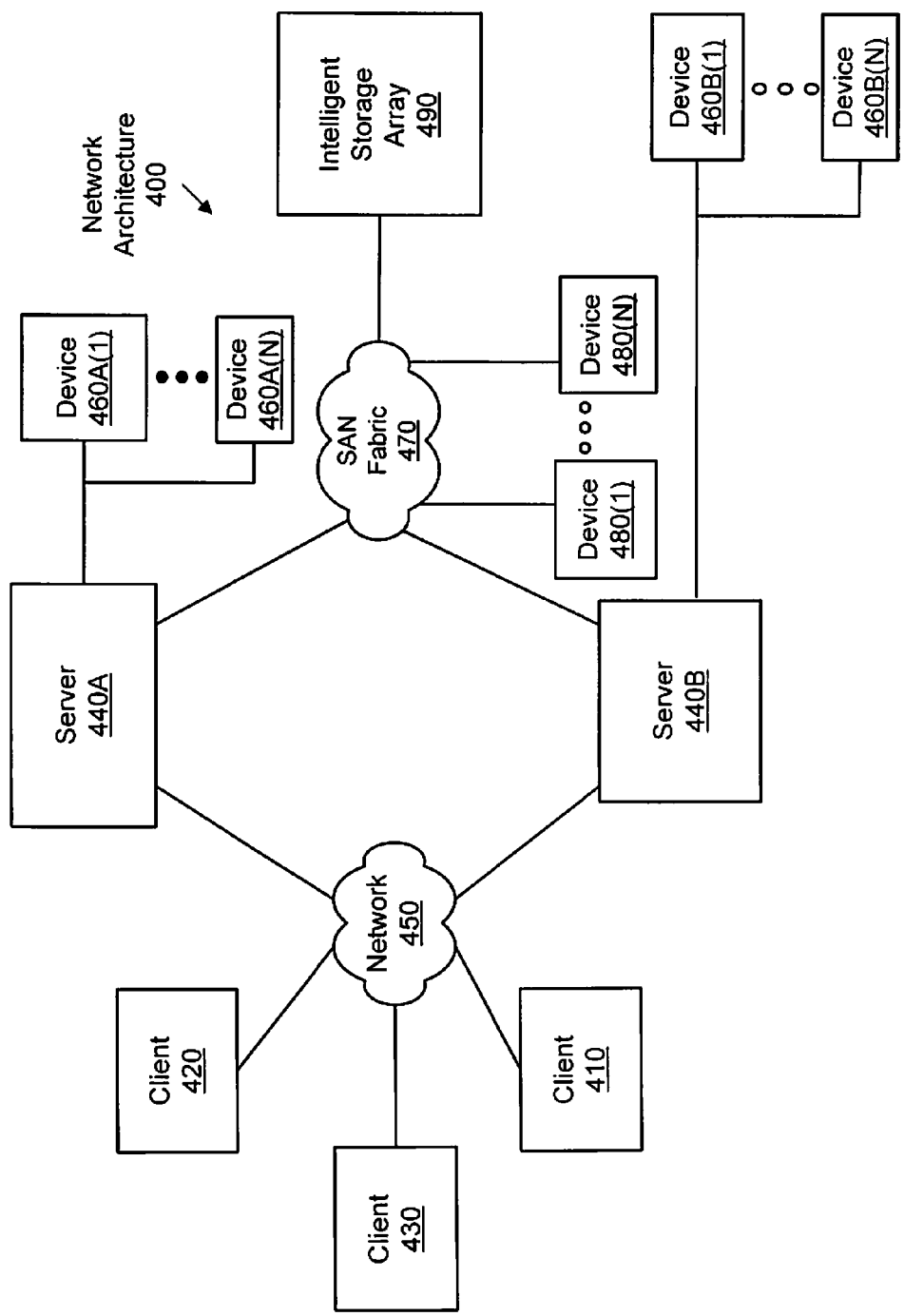
FIG. 4 is a block diagram depicting an example of a network architecture suitable for implementing embodiments of the present invention.

FIG. 4 is a block diagram depicting a network architecture 400 in which client systems 410, 420 and 430, as well as storage servers 440A and 440B (any of which can be implemented using computer system 310), are coupled to a network 450. Storage server 440A is further depicted as having storage devices 460A(1)-(N) directly attached, and storage server 440B is depicted with storage devices 460B(1)-(N) directly attached. Storage servers 440A and 440B are also connected to a storage-area network (SAN) fabric 470, although connection to a storage area network is not required for operation of the invention. SAN fabric 470 supports access to storage devices 480(1)-(N) by storage servers 440A and 440B, and so by client systems 410, 420 and 430 via network 450. Intelligent storage array 490 is also shown as an example of a specific storage device accessible via SAN fabric 470.

With reference to computer system 310, modem 347, network interface 348 or some other method can be used to provide connectivity from each of client computer systems 410, 420 and 430 to network 450. Client systems 410, 420 and 430 are able to access information on storage server 440A or 440B using, for example, a web browser or other client software (not shown). Such a client allows client systems 410, 420 and 430 to access data hosted by storage server 440A or 440B or one of storage devices 460A(1)-(N), 460B(1)-(N), 480(1)-(N) or intelligent storage array 490. FIG. 4 depicts the use of a network such as the Internet for exchanging data, but such a network is not limited to the Internet or any particular network-based environment.

Example Software Architectures

Figure 5:
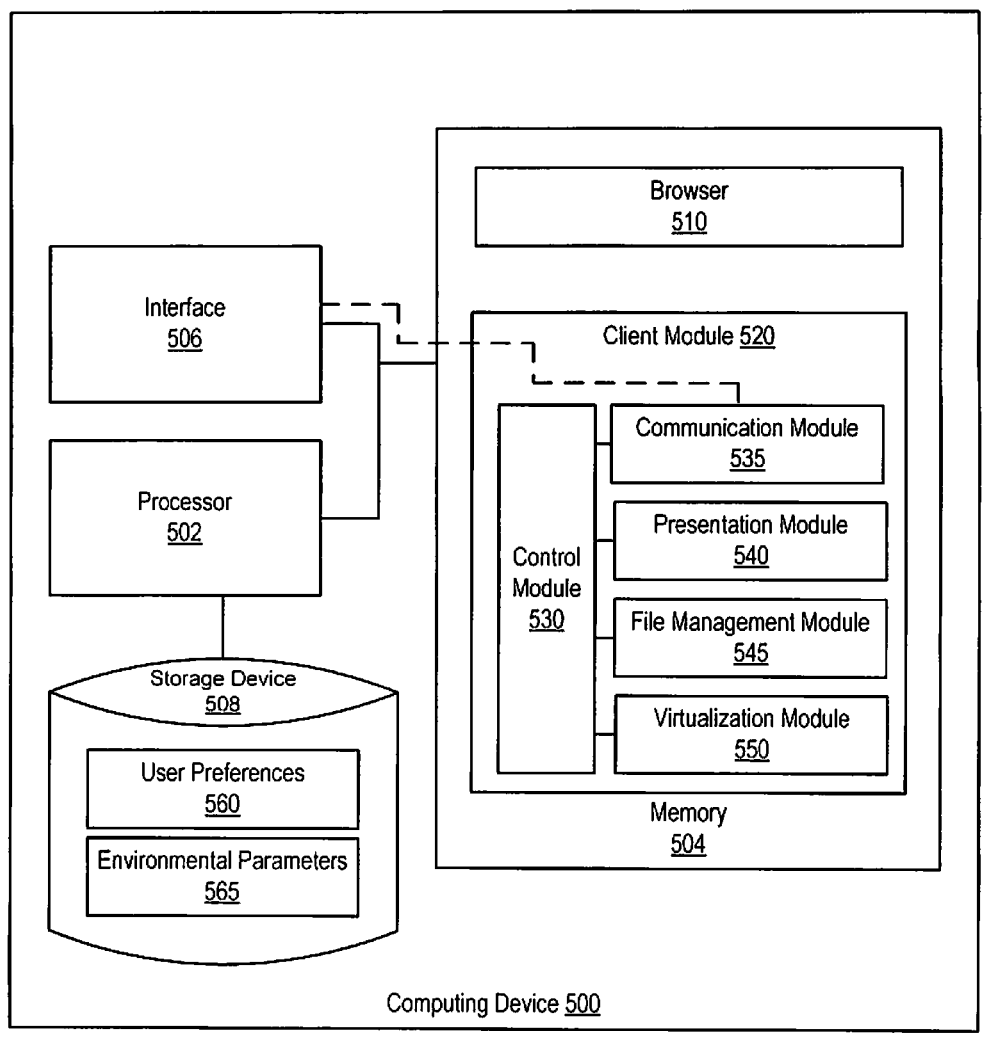
FIG. 5 is a simplified block diagram of an example of a client.

FIG. 5 illustrates the manner in which certain elements of a client can be implemented in software. FIG. 5 is a block diagram of a computing device 500 (e.g., one of the clients depicted in FIG. 1 or one of the virtual machine servers depicted in FIG. 2). As illustrated, computing device 500 includes one or more processors 502 (e.g., microprocessors, programmable logic devices (PLDs), or application-specific integrated circuits (ASICs)) configured to execute program instructions stored in memory 504. In the manner noted, memory 504 can include various types of RAM, ROM, flash memory, micro electro-mechanical systems (MEMS) memory, magnetic core memory and the like. Also as noted, memory 504 can include both volatile and non-volatile memory. Computing device 500 also includes one or more interfaces 506. Processor 502, interface 506 and memory 504 are coupled to send and receive data and control signals by a bus or other interconnect.

Interface 506 can include a network interface to various networks (e.g., such as wide area network 140 or local area network 150 of FIG. 1) and/or interfaces to various peripheral buses. Processor 502 can also access one or more storage devices (depicted in FIG. 5 as a storage device 508). Processor 502 can, for example, be used to access information stored on storage device 508 and to receive information from storage device 508. Interface 506 can be used to communicate with a virtual machine, and support the display of information on a client's web browser or other user interface.

In this example, program instructions and data executable to implement all or part of certain client functionality. For example, memory 504 is therefore depicted as having loaded therein a variety of software modules, including a browser 512 and a client module 520. Browser 510 can be any browser, such as a web browser. Client module 520 is capable of providing functionality similar to that of a browser, with regard to the display of information, but is an application-specific solution. In order to provide this functionality, client module 520 can include a control module 530, a communication module 535, a presentation module 540, a file management module 545 and a virtualization module 550. As will be appreciated, in light of the present disclosure, content is not typically downloaded to the client—the virtual machine sends only the information to be displayed, to the client. As will further be appreciated, however, if the given content is deemed safe, that content can be downloaded to the client, if the user so desires.

Control module 530 is configured to monitor and control the operations of sub-modules within client module 520.

Under the control of module 530, communication module 535 allows client module 520 to communication with a virtual machine via interface 506 (noted in FIG. 5 by a dashed line). Control module 530 can also generate information usable to provide a user interface to clients (e.g., control module 530 can provide information usable to present a graphical user interface, command line interface, or web-based interface (e.g., using browser 510)). In response to receiving information, control module 530 can parse the received information and control the processing of individual items. Thus, in communicating with the virtual machine which has been provisioned for the client, communication module 535 allows control module 530 to present information from the virtual machine via presentation module 540, using virtualization module 550. Control module 530 is also configured to monitor and manage content using file management module 545. File management module 545 provides functionality to support the management of local files and content on client 520, as well as the transport of content to and from one or more virtual machines (not shown).

Control module 530 is also configured to access storage device 508 using processor 502, on behalf of virtualization module 550. In so doing, virtualization module 550 is able to store and retrieve user preferences 560 and environmental parameters 565. As will be discussed subsequently, user preferences 560 and environmental parameters 565 can be used in the provisioning and configuration of the virtual machine(s) provisioned on behalf of the client. As will be appreciated, such information can also be maintained on (e.g., stored on and retrieved from) one of the virtual machine servers, or even more centrally (e.g., on the administration client).

The program instructions and data implementing client module 520 can be stored on various computer readable storage media such as memory 504 or storage device 508. In some embodiments, such software is stored on a computer readable storage medium such as a compact disc (CD), digital versatile disc (DVD), hard disk, optical disk, tape device, floppy disk, and the like. In order to be executed by processor 502, the instructions and data implementing client module 520 can be loaded into memory 504 from another computer readable storage medium. The instructions and/or data implementing client module 520 can also be transferred to computing device 500 for storage in memory 504 via a network such as the Internet or upon a carrier medium.

Figure 6:
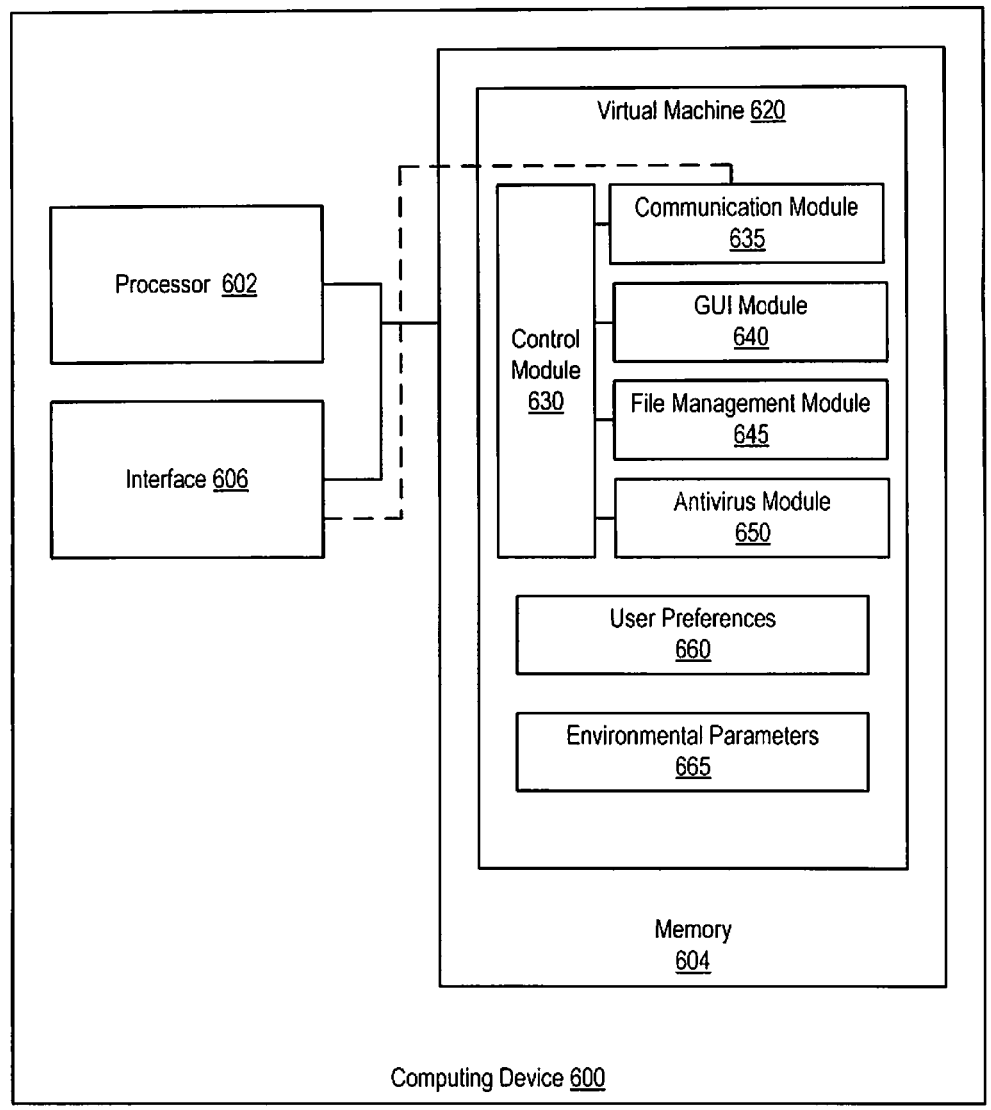
FIG. 6 is a simplified block diagram of an example of a virtual machine.

FIG. 6 illustrates the manner in which certain elements of a virtual machine server (e.g., virtual machine servers 230(1,1)-(N,N) of FIG. 2) can be implemented in software. FIG. 6 is a block diagram of a computing device 600 (e.g., one of the virtual machine servers depicted in FIG. 2). As illustrated, computing device 600 includes one or more processors 602 (e.g., microprocessors, PLDs, or ASICs) configured to execute program instructions stored in memory 604. In the manner noted, memory 604 can include various types of RAM, ROM, flash memory, MEMS memory, magnetic core memory and the like. Also as noted, memory 604 can include both volatile and non-volatile memory. Computing device 600 also includes one or more interfaces 606. Processor 602, interface 606, and memory 604 are coupled to send and receive data and control signals by a bus or other interconnect.

Interface 606 can include a network interface to various networks (e.g., such as wide area network 140 or local area network 150 of FIG. 1) and/or interfaces to various peripheral buses. Processor 602 can also access one or more storage devices. Processor 602 can, for example, be used to access information stored on such storage devices and to receive information from such storage devices. Interface 606 can be used to communicate with a client, and support the display of information on a client's web browser or other user interface, by providing information to the client for display via the client's browser or application-specific software.

In this example, program instructions and data executable to implement all or part of certain client functionality. For example, then, memory 604 is depicted as having loaded therein a variety of software modules, including a virtual machine 620. Virtual machine 620 is capable of providing the functionality of a computing device, but (given that virtual machine 620 is virtual) can be provisioned and deprovisioned. In order to provide this functionality for a client (or on behalf of another virtual machine), virtual machine 620 can support instantiations of a control module 630, a communication module 635, a graphical user interface (GUI) module 640 and a file management module 645. Virtual machine 620 also provides antivirus functionality via an antivirus module 650. As will be appreciated in light of the present disclosure, these and other modules can be supported by virtual machine 620, which implements its basic functionality by virtualizing some or all of the physical components of its respective virtual machine server.

Control module 630 is configured to monitor and control the operations of sub-modules within client module 620. Under the control of module 630, communication module 635 allows client module 620 to communication with a client via interface 606 (noted in FIG. 6 by a dashed line). Control module 630 can also generate information usable to provide a user interface to clients (e.g., control module 630 can provide information usable to present a graphical user interface on a client, via a web-based interface or an application-specific software interface). In response to various inputs, control module 630 can control the processing of individual tasks. Thus, in communicating with the client, communication module 635 allows control module 630 to present information from virtual machine 620 via interface 606.

Control module 630 is also configured to access a storage device using processor 602. In so doing, virtual machine 620 is able to store and retrieve user preferences 660 and environmental parameters 665. As will be discussed subsequently, user preferences 660 and environmental parameters 665 can be used in the provisioning and configuration of virtual machine 620. Control module 630 is also configured to monitor and manage content using file management module 645. File management module 645 provides functionality to support the management of content on virtual machine 620, as well as the transport of content and other information to and from one or more clients (not shown).

The program instructions and data implementing client module 620 can be stored on various computer readable storage media such as memory 604 or storage device 608. In some embodiments, such software is stored on a computer readable storage medium such as a CD, DVD, hard disk, optical disk, tape device, floppy disk, and the like. In order to be executed by processor 602, the instructions and data implementing client module 620 can be loaded into memory 604 from another computer readable storage medium. The instructions and/or data implementing client module 620 can also be transferred to computing device 600 for storage in memory 604 via a network such as the Internet or upon a carrier medium.

Figure 7:
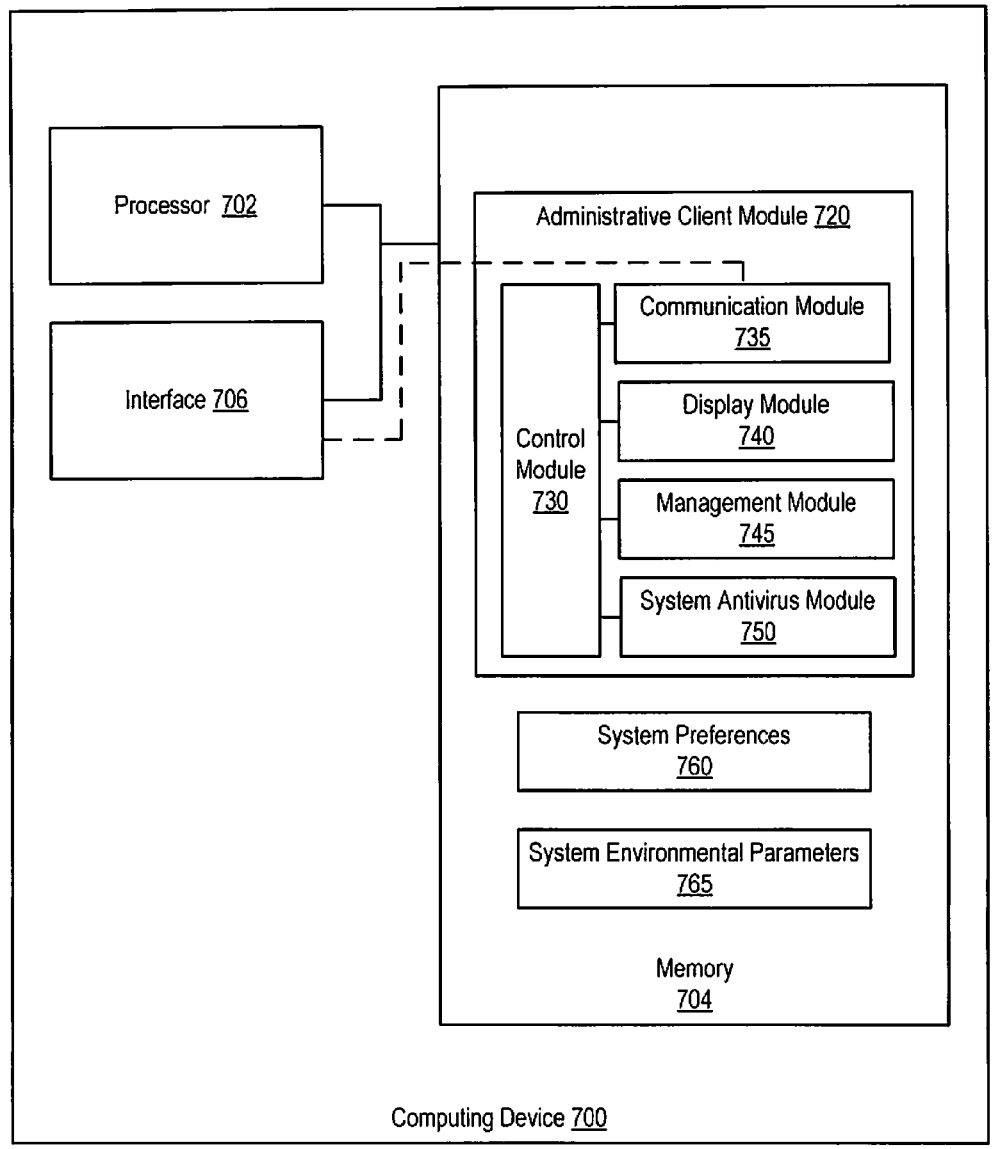
FIG. 7 is a simplified block diagram of an example of an administrative client.

FIG. 7 illustrates the manner in which certain elements of a administrative client (e.g., administrative client 220 of FIG. 2) can be implemented in software. FIG. 7 is a block diagram of a computing device 700. As illustrated, computing device 700 includes one or more processors 702 (e.g., microprocessors, PLDs, or ASICs) configured to execute program instructions stored in memory 704. In the manner noted, memory 704 can include various types of RAM, ROM, flash memory, MEMS memory, magnetic core memory and the like. Also as noted, memory 704 can include both volatile and non-volatile memory. Computing device 700 also includes one or more interfaces 706. Processor 702, interface 706, and memory 704 are coupled to send and receive data and control signals by a bus or other interconnect.

Interface 706 can include a network interface to various networks (e.g., such as wide area network 140 or local area network 150 of FIG. 1) and/or interfaces to various peripheral buses. Processor 702 can also access one or more storage devices. Processor 702 can, for example, be used to access information stored on such storage devices and to receive information from such storage devices. Interface 706 can be used to communicate with a client, and support the display of information on a client's web browser or other user interface, by providing information to the client for display via the client's browser or application-specific software.

In this example, program instructions and data executable to implement all or part of certain client functionality. For example, then, memory 704 is depicted as having loaded therein a variety of software modules, including an administrative client 720. Administrative client 720 allows an administrator to administer a virtual machine server farm (such as virtual machine server farm 210). Such functionality thus allows administrative client 720 to administer virtual machine servers and the virtual machines executed thereon (virtual machine servers 230(1,1)-(N,N) and virtual machines 240(1,1,1)-(N,N,N) in FIG. 2, respectively). In order to provide this functionality, administrative client 720 can include a control module 730, a communication module 735, a display module 740 and a management module 745. Administrative client 720 also provides antivirus functionality via a system antivirus module 750.

Control module 730 is configured to monitor and control the operations of sub-modules within administrative client 720. Under the control of module 730, communication module 735 allows administrative client 720 to communication with the virtual machine server farm via interface 706 (noted in FIG. 7 by a dashed line). Control module 730 can also generate information usable to administer the virtual machine server farm. In response to various inputs, control module 730 can control the processing of individual tasks in the administration of the virtual machine server farm. Thus, in communicating with the virtual machine servers of the virtual machine server farm, communication module 735 allows control module 730 to present information to the user of administrative client 720. Control module 730 is also configured to access a storage device using processor 702. In so doing, administrative client 720 is able to store and retrieve administrative information regarding the virtual machine server farm. Control module 730 is also configured to monitor and manage content using file management module 745. File management module 745 provides functionality to support the management of content on one or more virtual machines (not shown), as well as the transport of content and information between such virtual machines and one or more client machines (also not shown).

Control module 730 is also configured to access a storage device using processor 702. In so doing, virtual machine 720 is able to store and retrieve system preferences 760 and system environmental parameters 765. As will be discussed subsequently, system preferences 760 and system environmental parameters 765 can be used in the provisioning and configuration of virtual machines. The ability to provide system-wide preferences and environmental parameters allows a system administrator to set entity-wide policies for use of the virtual machine server farm, or a portion thereof. Moreover, the administration of a virtual machine server farm is greatly simplified, as the system preferences and environmental parameters can be downloaded to the virtual machines from a single point, allowing changes to policies to be implemented by revising the requisite preferences and environmental parameters.

The program instructions and data implementing administrative client 720 can be stored on various computer readable storage media such as memory 704 or storage device 708. In some embodiments, such software is stored on a computer readable storage medium such as a CD, DVD, hard disk, optical disk, tape device, floppy disk, and the like. In order to be executed by processor 702, the instructions and data implementing administrative client 720 can be loaded into memory 704 from another computer readable storage medium. The instructions and/or data implementing administrative client 720 can also be transferred to computing device 700 for storage in memory 704 via a network such as the Internet or upon a carrier medium.

Example Processes for Secure Network Access

Figure 8:
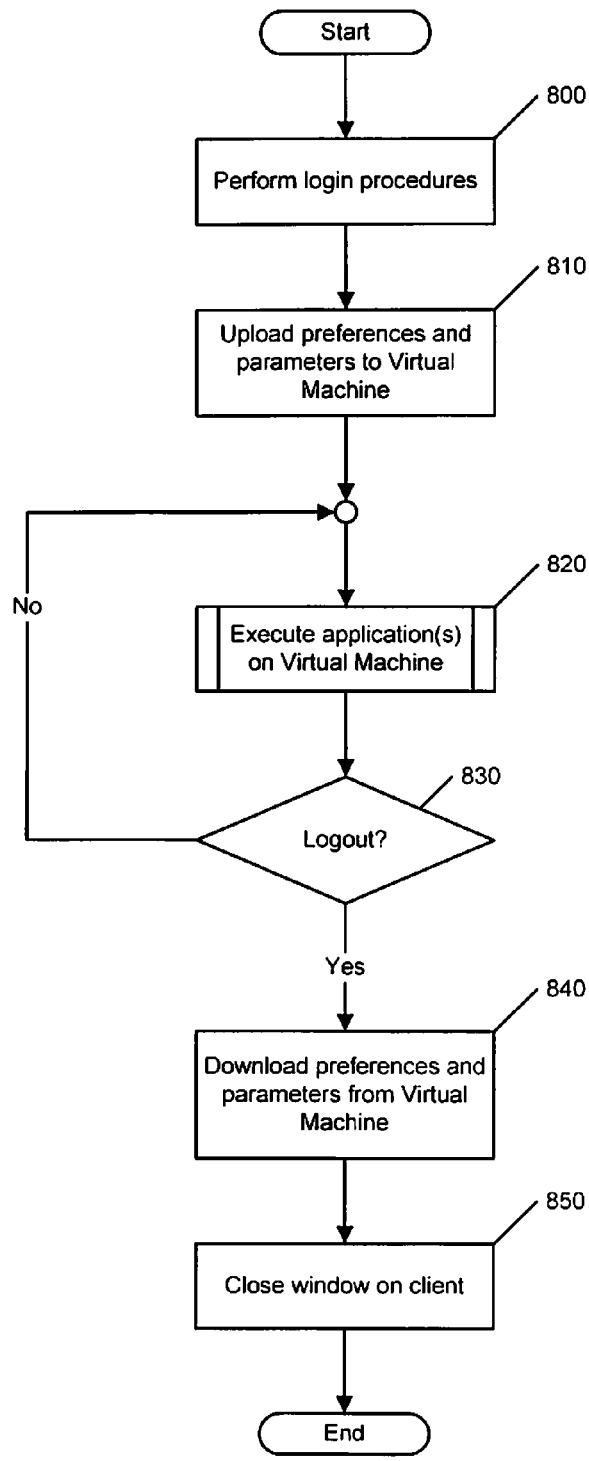
FIG. 8 is a simplified flow diagram illustrating an example of operations carried out by a client.

FIG. 8 is a simplified flow diagram illustrating an example of operations carried out by a client such as client 120, client 130 or one of clients 160(1)-(N). The process begins with login procedures (step 800). These login procedures can include, for example, a user's logging into the client, the user configuring a connection between the client and the virtual machine server farm's virtual machine servers/virtual machines, setting user preferences for one or more virtual machines, and the like. As will be appreciated, in light of the present disclosure, the ability to have multiple login accounts can be used to constrain the network access (e.g., access to information on the Internet) permitted for certain accounts, while giving full network access to others. Such network access can be administered centrally, as noted elsewhere. This can be used to allow a business' system administrator to prevent access to inappropriate web sites, for example.

Once the particular login procedures for the given implementation have been performed, user preferences and environmental parameters, among other such information, can then be uploaded from the client machine and/or retrieved from the virtual machine server's local storage device, for use by the virtual machine server in provisioning the virtual machine. These user preferences and environmental parameters are also available for use by the virtual machine being(s) provisioned (step 810). With the necessary information uploaded and virtual machine(s) configured, the user is now able to execute one or more applications on the given virtual machine(s) (step 820). Execution of applications on the virtual machine(s) continues until the user indicates that they wish to logout (step 830). Upon logout, the virtual machine(s) can download user preferences and/or environmental parameters from the virtual machines(s) in use, to the client for storage (step 840). It will be appreciated that such user preferences and/or environmental parameters (or portion thereof) can also be stored locally to the virtual machine server, on its storage device. Having logged out, the window on the client can then be closed (step 850). In the foregoing manner, the client acts only to display information from the virtual machine. While files (executable files, data files, and the like) can be downloaded from the virtual machine to the client, it will be typically be the case that such files will be maintained on the virtual machine, at least until the user is logged out. That said, the user is able to download such files at any time during the session with the virtual machine.

Figure 9:
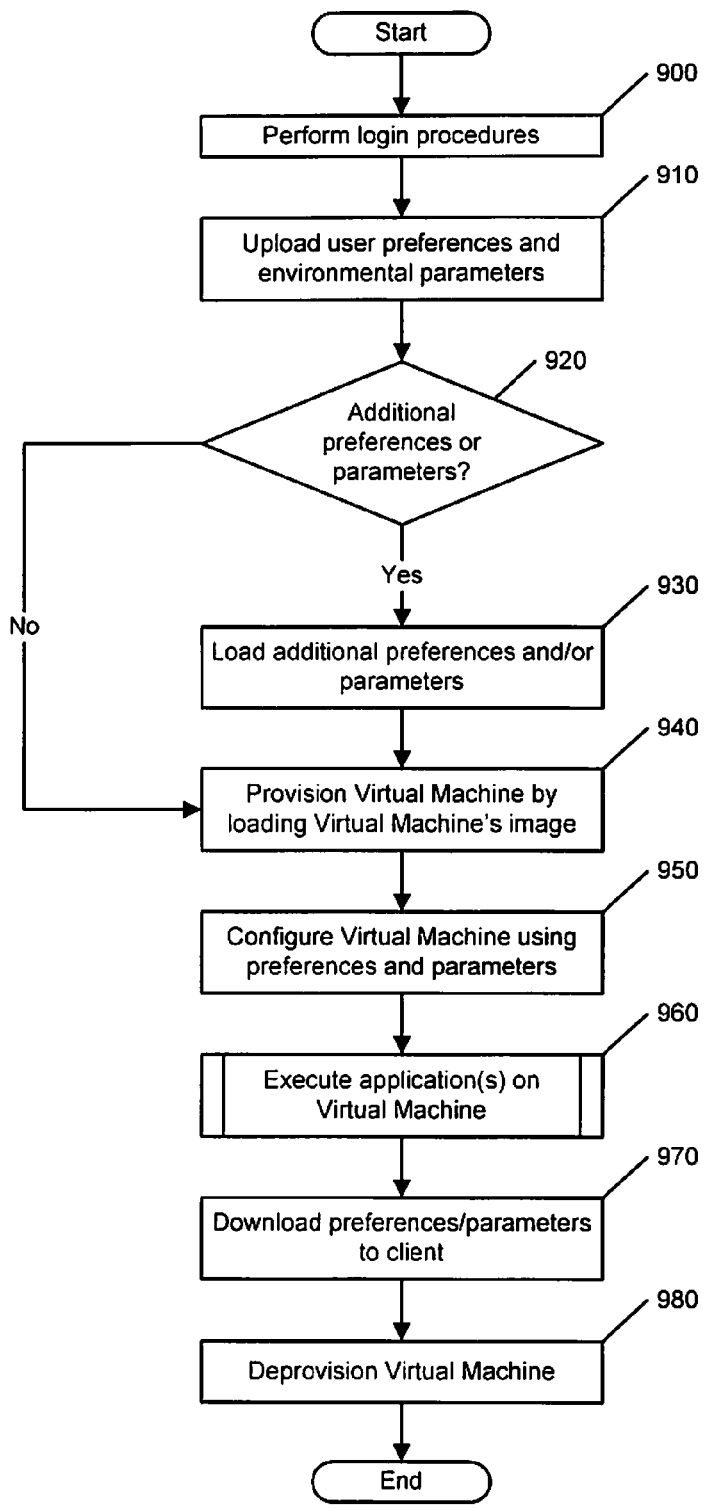
FIG. 9 is a simplified flow diagram illustrating an example of operations carried out by a virtual machine.

FIG. 9 is a simplified flow diagram illustrating the operations carried out by a virtual machine, such as one of virtual machines 240(1,1,1)-(N,N,N). The process begins with a client logging into the virtual machine server on which the virtual machine is to be provisioned (step 900). Next, any user preferences and/or environmental parameters stored on the client or the virtual machine server are uploaded for the virtual machine being provisioned (step 910). At this point, the user can be prompted for additional user preferences, and any additional environmental parameters can be determined (step 920). If further user preferences or environmental parameters are desired or necessary, these additional preferences and/or parameters are loaded (step 930). Once any additional preferences or parameters have been loaded (or if none are needed), the virtual machine is provisioned on the virtual machine server by loading the virtual machine's image (step 940). Any user preferences and/or environmental parameters needed by the virtual machine can also be loaded at this time. The virtual machine is then configured on the virtual machine server, using the user preferences and environmental parameters that have been loaded (step 950).

With the virtual machine provisioned, one or more applications can then be executed on the virtual machine (step 960). As part of executing applications on the virtual machine, the virtual machine can perform a number of operations to determine whether a website, file, or other data/data source is safe. The safety of a website or file, in this scenario, implies that the website or file does not contain a virus, or other code that will consume the resources of the virtual machine or alter any of resources of the virtual machine. A process of determining the safety of a website or file is described in greater detail in connection with FIGS. 10 and 11. Once a user is finished executing applications on the virtual machine, the virtual machine can download user preferences and/or environmental parameters to the client or virtual machine server (step 970). Once the preferences/parameters have been downloaded to the client or virtual machine server, the virtual machine can then be de-provisioned (step 980).

Figure 10:
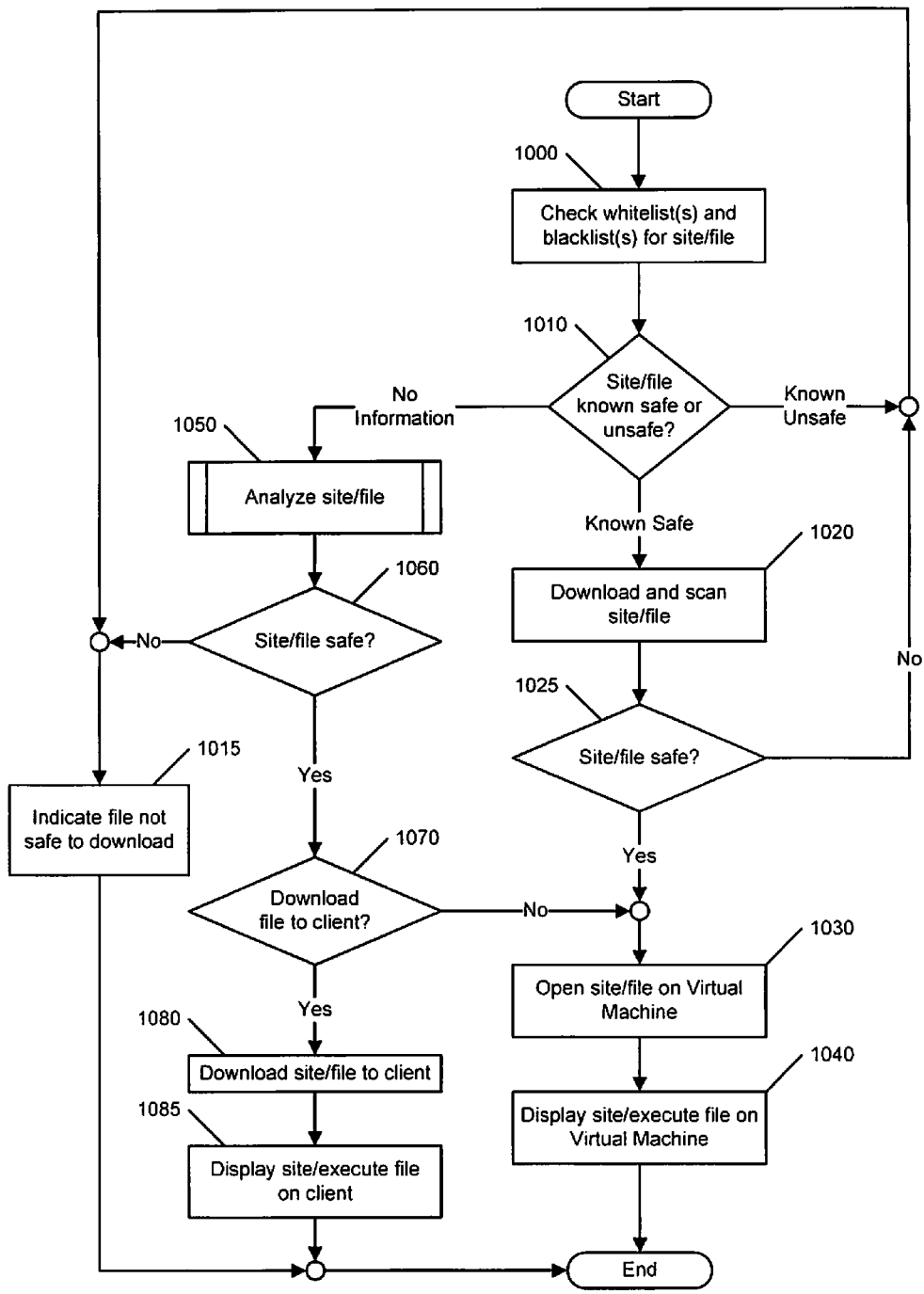
FIG. 10 is a simplified flow diagram illustrating an example of operations carried out by a virtual machine in analyzing a file or web site.

FIG. 10 is a simplified flow diagram illustrating the operations carried out by the virtual machine in analyzing a file or website in order to determine if the file or website is safe. The process begins with a determination as to whether the site/file (or other content) is listed on one or more whitelists and/or one or more blacklists (step 1000). This determination allows the system to quickly determine whether content such as a site/file is known-good or known-bad, by determining if the content is represented in the whitelist or blacklist by an entry therein. Moreover, if a virtual machine determines that a site/file is safe (or not), such lists can be updated quickly. Because of the centralization provided by the use of a virtual machine server farm, this information is made available to other virtual machines in real time. Another advantage of this centralized approach is the ability to use sophisticated statistical techniques, artificial intelligence techniques and the like, to make a determination as to the safety of a given site/file. A simple example is the situation in which a site/file is found to contain a virus—in such a situation, the site/file can be blacklisted, allowing other virtual machines to make such a determination by simply checking the blacklist(s), and so saving those other virtual machines the effort and resources that would otherwise be required to analyze the given site/file. The ability to share such information among virtual machines allows many other alternatives that will be apparent in light of the present disclosure.

The foregoing also suggests the use of whitelists for allowing access to only known-good sites, referred to herein as "secure sessions". In such a case, such secure sessions are prevented from accessing any sites not on the whitelist, thereby minimizing the chance of even the virtual machine being infected or snooped. Such restrictions can be implemented on the client, or by the virtual machine(s) through which the client accesses the given content. Additionally, special security protocols can be implemented (either proprietary or publicly available), to further secure the communications taking place (e.g., banking transactions). For example, a mutually agreed upon protocol (e.g., for a virtual private network (VPN)) can be implemented.

If the site/file is listed on a blacklist (step 1010), an indication is made to the client that the file is not safe to download (step 1015). However, if the site/file is known to be safe (step 1010), the virtual machine downloads and scans the site/file, as a precaution against new viruses that may not be on the aforementioned whitelists and/or blacklists (step 1020). Once the website/file have been downloaded and scanned, a determination is made as to whether the site/file is safe (step 1025). If the site/file is safe, the site/file is then opened by the virtual machine (step 1030). The site/file is then displayed/executed by the virtual machine (step 1040). However, if the scan of the site/file indicates that the site/file is not safe, an indication is made to the client in this regard (step 1015). The process then concludes.

If the site/file is not listed on the whitelist(s) or blacklist(s) (step 1010), the file is analyzed (step 1050). An example of the operations performed and analyzing a file are described in detail in connection with FIG. 11. A determination is then made as to whether the aforementioned analysis of the site/file indicates that the site/file is safe (step 1060). If the analysis indicates that the site/file is not safe, an indication is made to the client that the site/file is not safe to download (step 1015). If a determination is made that the site/file is safe, a determination is then made as to whether the site/file should be downloaded to the client, or opened and displayed using the virtual machine (step 1070). If the virtual machine is to open and display the site/file, the site/file is downloaded to the virtual machine (unless the site/tile has already been downloaded to the virtual machine), and the site/file opened by the virtual machine (step 1030). Once opened, the site/file can then be displayed/executed on the virtual machine (step 1040). Alternatively, the site/file can be downloaded to the client for access directly on the client (step 1080). Once downloaded to the client, the client can then display the site/execute the file (step 1085).

Figure 11:
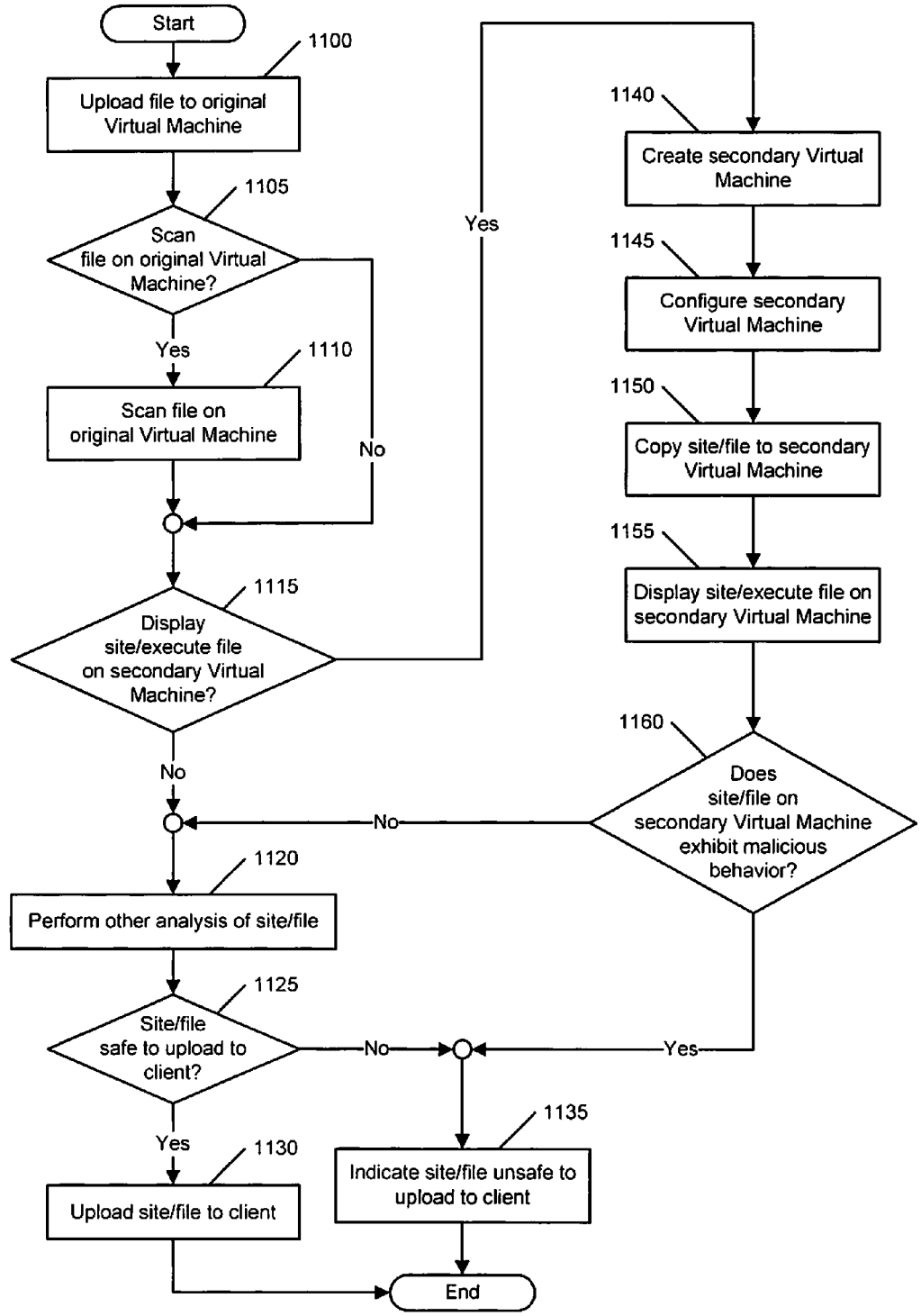
FIG. 11 is a simplified flow diagram illustrating an example of operations carried out by one or more virtual machines in analyzing a file or web site.

FIG. 11 is a simplified flow diagram illustrating an example of the operations carried out by one or more virtual machines in analyzing a site/file. In the following discussion, reference will be made to an original virtual machine and a secondary virtual machine. While, for purposes of this discussion, the original virtual machine is that which has been provisioned to execute applications on behalf of, and for display by a given client, and the secondary virtual machine having been provisioned on behalf of the original virtual machine, the processes described herein can be carried out by any two virtual machines, or more than two virtual machines. As will be further appreciated in light of the present disclosure, accessing content (e.g., by emulation) can alternatively be performed using only the original virtual machine. The process begins with the upload of a site/file to the original virtual machine (step 1100). A determination is then made as to whether the site/file should be scanned on the original virtual machine (step 1105). If the site/file is to be scanned on the original machine (step 1105), the original virtual machine proceeds with scanning the site/file (step 1110). A determination is then made as to whether the file should be analyzed displaying the site/executing the file using a secondary virtual machine (step 1115). If no such display/execution is desired (or required), other analysis of the site/file can be performed by the original virtual machine (step 1120). Based on the various analyses have been performed, a determination is then made as to whether it is safe to upload the file to the client (step 1125). If it is safe to upload the site/file to the client, the site/file is uploaded to the client (step 1130). If the site/file is not safe to upload to the client, an indication in this regard is made (step 1135).

However, it may be desirable (or advisable) to actually access the site or execute the file, in order to determine the effects on the machine on which the site is accessed/file is executed. If such access/execution is desired (step 1115), a secondary virtual machine is provisioned. This provisioning includes the creation of the secondary virtual machine (step 1140) and the configuration of the secondary virtual machine (step 1145). The configuration of the secondary virtual machine can be performed using default user preferences and environmental parameters, or can be performed in the manner of the provisioning of the original virtual machine, downloading the user preferences and/or environmental parameters from the client. In either case, the secondary virtual machine is configured (step 1145). The site/file is then copied from the original virtual machine to the secondary virtual machine (step 1150).

Once the site/file has been copied to the secondary virtual machine, the file copied to the secondary virtual machine is executed (or the site is accessed by the secondary virtual machine) (step 1155). With regard to execution, the file being executed can be executed by an emulator, or simply executed by the secondary virtual machine. As noted, certain viruses may not be detectable via emulation, or will attack the virtual machine as part of an attempted emulation. If emulation proves problematic for some reason, or there is a desire to ensure that the file can be executed normally, there is no harm in simply executing the file in question on the secondary virtual machine. If the secondary virtual machine is compromised, as noted, the secondary virtual machine can simply be deprovisioned. This provides an avenue for checking a file that has been infected by a virus that is not be detectable emulation or mounts an attack as part of an attempted emulation.

A determination is then made as to whether the file executing on the secondary virtual machine exhibits any malicious behavior, consumes an inordinate amount of resources on the secondary virtual machine, alters any resources on the secondary virtual machine, or otherwise behaves inappropriately (step 1160). If such behavior is exhibited (step 1160), an indication is made to the client that the site/file is unsafe to upload to the client (step 1135). However, if it is determined that the file executing/site being accessed by the secondary virtual machine is not exhibiting any such behavior, other analysis of the site/file can be performed (either on the secondary virtual machine or on the original virtual machine) (step 1120). Once again, a determination is a made as to whether the site/file is safe to upload to the client (step 1125). If the site/file is unsafe to upload to the client, an indication is made in this regard (step 1135). If the site/file is safe to upload to the client, the virtual machine (the original virtual machine or the secondary virtual machine) uploads the site/file to the client (step 1130).

Other Embodiments

The foregoing detailed description has set forth various embodiments via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

In so doing, the foregoing detailed description has also set forth embodiments including components contained within other components (e.g., the various elements shown as components of a computer system). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Moreover, these embodiments have been described in the context of fully functional computer systems; however, those skilled in the art will appreciate that the embodiments described herein, as well as others, are capable of being distributed as a program product in a variety of forms, and apply equally regardless of the particular type of signal bearing media used to actually carry out the distribution. Examples of signal bearing media include computer-readable storage media, transmission type media such as digital and analog communications links, as well as media storage and distribution systems developed in the future.

The preceding description is intended to be illustrative of the invention and should not be taken to be limiting. Other embodiments are possible. In light of the present disclosure, those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
provisioning, using one or more hardware processors of a virtual machine server, a virtual machine, wherein said virtual machine is provisioned on said virtual machine server:
  said virtual machine server is communicatively coupled to a client computer system, and
  said virtual machine server and said client computer system are distinct from one another;
downloading content to said virtual machine, wherein said downloading is performed prior to downloading said content to said client computer system;
determining, by said virtual machine, whether said content is safe; and
in response to determining, by said virtual machine, that said content is safe, sending information from said virtual machine to said client computer system from, wherein said information from said virtual machine is configured to allow display of output from said virtual machine, said output is based on said content, and
said content is not sent to said client computer system.

2. The method of claim 1, wherein said provisioning comprises:
loading an image of said virtual machine on said virtual machine server.

3. The method of claim 1, further comprising:
in response to determining that the content is not safe,
if said content comprises a virus, deprovisioning said virtual machine.

4. The method of claim 1, wherein the determining comprises:
analyzing said content, wherein
said analyzing is configured to detect a virus.

5. The method of claim 4, further comprising:
if said analyzing detects the virus, performing one or more of
deprovisioning said virtual machine, or
adding an identifier to a blacklist, wherein
said identifier is configured to identify said content.

6. The method of claim 1, further comprising:
prior to sending said information to said client computer system,
in response to determining that said content is safe,
determining whether said content is to be downloaded to said client computer system, and
in response to determining that said content is not to be downloaded to said client computer system, not including said content with said information.

7. The method of claim 4, wherein the determining further comprises:
accessing said content, wherein
said accessing comprises
if said content is a web site, opening said web site,
if said content is a script, processing said script, and
if said content is an executable file, executing said executable file.

8. The method of claim 1, wherein
said virtual machine is a first virtual machine, and
said determining comprises
determining whether to use a second virtual machine to access said content,
in response to a determination that said second virtual machine is to be used,
provisioning said second virtual machine,
downloading said content from said first virtual machine to said second virtual machine, and
causing said second virtual machine to access said content, and
in response to a determination that said second virtual machine is not to be used,
causing said first virtual machine to access said content.

9. The method of claim 8, wherein said determining further comprises:
causing said second virtual machine to analyze said content, wherein
said analyzing is configured to detect a virus.

10. The method of claim 9, further comprising:
if said analyzing detects said virus, performing at least one of
deprovisioning said virtual machine, and
sending an indication.

11. The method of claim 1, further comprising:
comparing information regarding said content to a whitelist; and
if said content is represented in said whitelist, permitting said virtual machine to access said content.

12. The method of claim 1, further comprising:
comparing information regarding said content to a blacklist; and
if said content is represented in said blacklist, deprovisioning said virtual machine.

13. The method of claim 1, wherein the determining comprises:
accessing said content, wherein
said accessing comprises
if said content is a web site, opening said web site,
if said content is a script, processing said script, and
if said content is an executable file, executing said executable file.

14. The method of claim 13, further comprising:
receiving control information from said client computer system;
using said control information by the virtual machine, wherein
said information is based on the control information.

15. An apparatus comprising:
a plurality of virtual machine servers, wherein each of said plurality of virtual machine servers comprises one or more hardware processors, wherein
each of said virtual machine servers is configured to support at least one of a plurality of virtual machines, wherein
each of said virtual machine servers is configured to provision said at least one of said virtual machines,
a first virtual machine of said virtual machines comprises an antivirus module,
said first virtual machine is configured to download content prior to said content being downloaded to a client computer system, wherein
said client computer system is distinct from said first virtual machine server,
said antivirus module is configured to detect a virus by virtue of being configured to analyze said content,
said first virtual machine is further configured to, in response to said antivirus module detecting said virus, send information to said client computer system,
said information is configured to allow display of output from said first virtual machine,
said output is based on said content, and
said content is not sent to said client computer system.

16. The apparatus of claim 15, wherein said each of said virtual machine servers are configured to support said at least one of said virtual machines by virtue of being configured to:
deprovision said at least one of said virtual machines.

17. The apparatus of claim 15, further comprising:
a first virtual machine server, wherein
said first virtual machine server is configured to support said first virtual machine,
said first virtual machine server is configured to deprovision said first virtual machine, in response to said antivirus module detecting said virus, and
said plurality of virtual machine servers comprise said first virtual machine server.

18. The apparatus of claim 15, wherein
said first virtual machine is further configured to
determine whether to use a second virtual machine to access said content,
in response to a determination that said second virtual machine is to be used, cause said second virtual machine of said virtual machines to
   download said content, and
   access said content, and
in response to a determination that said second virtual machine is not to be used,
   access said content.

19. The apparatus of claim 18, further comprising:
a first virtual machine server, wherein
   said first virtual machine server is configured to support said second virtual machine,
   said first virtual machine server is configured to deprovision said second virtual machine, in response to said content comprising said virus, and
   said plurality of virtual machine servers comprise said first virtual machine server.

20. The apparatus of claim 15, further comprising:
an administrative client, wherein
   said administrative client is configured to configure said plurality of virtual machine servers by virtue of being configured to provide system preferences and system environmental parameters to said each of said virtual machine servers.

21. An apparatus comprising: one or more hardware processors comprising:
   a plurality of virtual machine servers;
      means for provisioning a virtual machine on a first virtual machine server of said plurality of virtual machine servers, wherein
      said virtual machine comprises an antivirus module,
      said first virtual machine is configured to download content, wherein
         said first virtual machine is configured download said content prior to said content being downloaded to a client computer system, wherein
         said client computer system is communicatively coupled to said first virtual machine server, and
         said client computer system is distinct from said first virtual machine server, and
         said antivirus module is configured to detect a virus by virtue of being configured to analyze said content;
      means for downloading said content to said virtual machine;
      means for determining whether said content is safe; and
      means for sending, in response to determining that said content is safe, information from said virtual machine, wherein
         said information from said virtual machine is configured to allow display of output from said virtual machine,
         said output is based on said content, and
         said content is not sent to said client computer system.

22. The apparatus of claim 21, further comprising:
said client computer system, wherein
   said client computer system is configured to display said information.

23. The apparatus of claim 22, wherein said client computer system is configured to display said information by virtue of being configured to
   remotely render said content,
   said virtual machine server is communicatively coupled to a network, and
   said virtual machine is configured to provide said client computer system with anonymous access to said network.

24. The apparatus of claim 23, wherein
said access by said client computer system to said network consists only of access to said network via said virtual machine.

25. The apparatus of claim 24, wherein
said access by said client computer system to said network is restricted by said virtual machine.

26. The apparatus of claim 23, wherein
said access by said client computer system to said network consists only of access to said network via said virtual machine.

27. The method of claim 1, further comprising:
the determining comprises analyzing, at least by said virtual machine, the content, wherein
   the determining determines that the content is safe based on the analyzing.

28. The method of claim 1, wherein
the determining is performed automatically by said virtual machine.

29. The method of claim 1, wherein
said provisioning of said virtual machine comprises
   receiving login credentials of a user,
   determining user preferences associated with said login credentials, and
   uploading said user preferences to said virtual machine.

30. The apparatus of claim 21, wherein
said means for determining whether said content is safe comprises
   means for accessing one or more whitelists, and
   means for accessing one or more blacklists.

* * * * *